United States Patent [19]

Umano

[11] 4,453,421
[45] Jun. 12, 1984

[54] LOAD MONITORING SYSTEM FOR A PRESS

[75] Inventor: Yasuhiro Umano, Terai Terai, Japan

[73] Assignee: Kabushiki Kaisha Komatsu Seisakusho, Tokyo, Japan

[21] Appl. No.: 398,390

[22] Filed: Jul. 14, 1982

[30] Foreign Application Priority Data

Jul. 30, 1981 [JP] Japan .............................. 56-118536

[51] Int. Cl.³ .............................................. G01L 1/16
[52] U.S. Cl. ................................... 73/862.54; 100/99; 364/506; 364/508
[58] Field of Search .......... 100/99; 73/862.53, 862.54, 73/790, 818; 364/505, 506, 508

[56] References Cited

U.S. PATENT DOCUMENTS

| | | | |
|---|---|---|---|
| 4,033,252 | 7/1977 | Baker | 100/99 |
| 4,059,991 | 11/1977 | Dybel et al. | 73/862.53 X |
| 4,098,105 | 7/1978 | Fullers et al. | 364/508 X |
| 4,116,050 | 9/1978 | Tanahashi et al. | 100/99 X |
| 4,177,517 | 12/1979 | Mette et al. | 364/506 X |

FOREIGN PATENT DOCUMENTS 656084 4/1979 U.S.S.R. ............................. 100/99

OTHER PUBLICATIONS

"Force-Displacement Measurement Apparatus", L. F. Foytlin, *IBM Tech. Disclosure Bulletin*, vol. 18, No. 1, pp. 199-201, Jun. 1975.

*Primary Examiner*—Gerald Goldberg
*Assistant Examiner*—Brian Tumm
*Attorney, Agent, or Firm*—Spensley, Horn, Jubas & Lubitz

[57] ABSTRACT

A load monitoring system for a press comprises a slide-position counting circuit, A/D converter, random access memory and display. The load monitoring system receives a load value applied to the press and a slide position value from a load detector and a slide position detector mounted on the press. The load value is converted into a digital value through the A/D converter, and undergoes sampling according to the slide position. The sampled digital load values are sequentially stored in the random access memory and after the measurement of the load, the stored values are sequentially displayed together with the corresponding slide positions. The load monitoring further comprises a calibration circuit for automatically carrying out calibration as well as slide position setters for measurement start, measurement end and display. By these position setters, slide positions at which load measurement starts and ends, and corresponding to which the measured and stored load value is displayed can be set manually.

5 Claims, 1 Drawing Figure

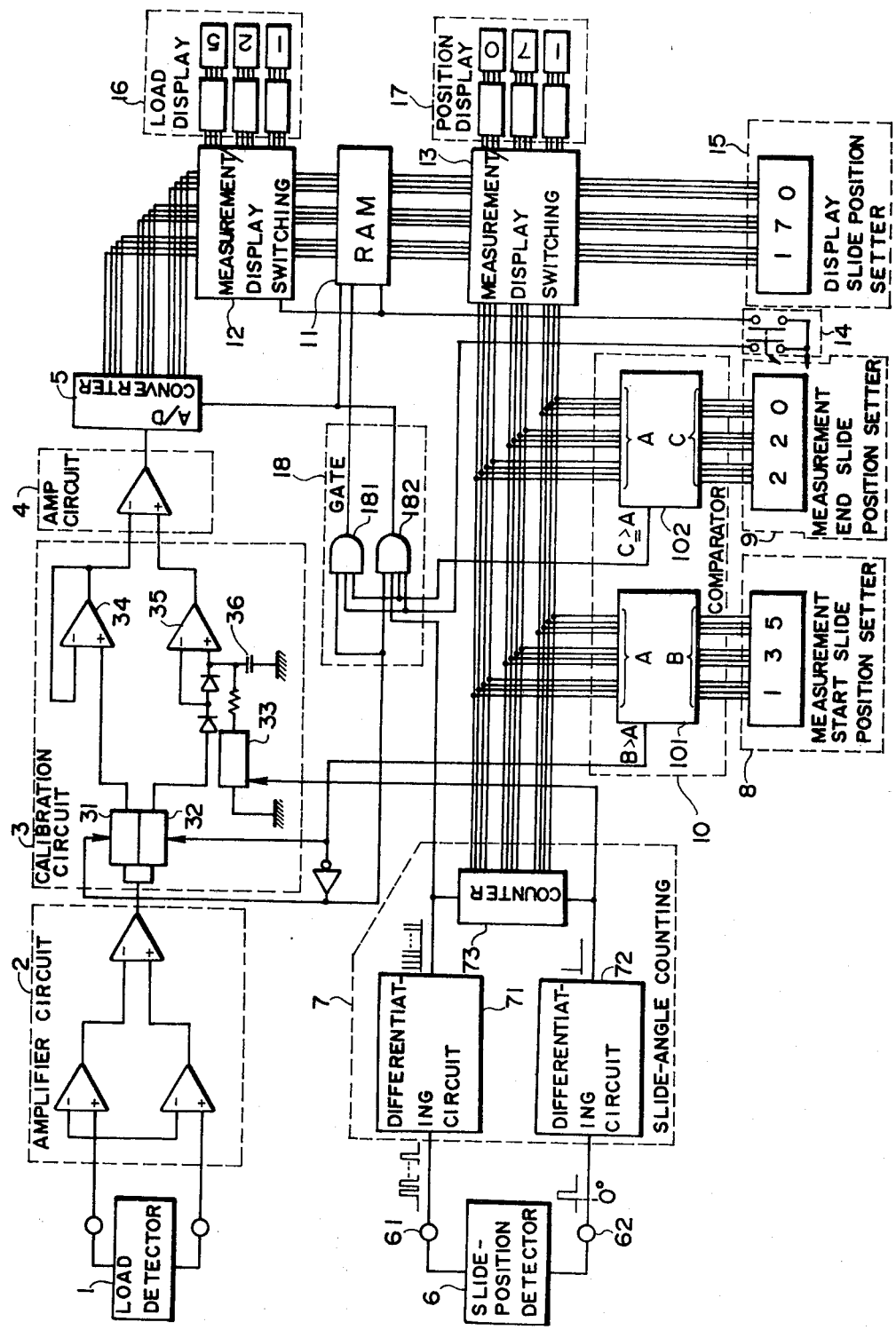

LOAD MONITORING SYSTEM FOR A PRESS

BACKGROUND OF THE INVENTION

The present invention relates to a system for measuring and monitoring loads incurred by a load detector mounted on a press.

Of prior art load monitoring systems, there has been, so far, a well known system in which a load detector such as a strain gauge and a piezoelectric element mounted on a slide or an up/down rod of the press detects a load applied to a work piece in the form of an electric signal during pressing operations of the press, and a load meter indicates, for example, a maximum value of the detected load on a display.

In this type of a conventional load monitoring system, an output from the load monitoring system and an output from a slide-position detector provided in the press (for example, a rotary cam switch mounted on a driving shaft) are simultaneously supplied to an electromagnetic oscillograph for display, and then an operator of the press converts the display results to digital values on the basis of the calibrated initial values in order to obtain load changes with respect to positions of the slide (that is, an up or down position of the slide) in the press.

Such a load monitoring system, however, had disadvantages in that the system involves a great amount of time in calibration as well as setting of the system and is troublesome in its handling, thereby requiring considerable operator's skill.

SUMMARY OF THE INVENTION

Accordingly, it is an object of the present invention to provide a load monitoring system for a press which allows a direct measurement and display of load values with respect to each slide position.

Another object of the present invention is to provide a load monitoring system for a press which allows an arbitrary setting of the sampling start and sampling end position as its slide position, whereby the time necessary for calibration and setting of the monitor can be remarkably reduced.

Still another object of the present invention is to provide a load monitoring system for a press in which load values with respect to each slide position are stored to be later displayed, and thus the load values with respect to slide positions can be readily measured without the necessity for operator's skill.

According to the present invention, output from a load detector and a slide-position detector mounted on the press are applied simultaneously to the load monitor. In the load monitor, varying analog voltages supplied from the load detector are converted into digital forms. The digital voltages are sequentially undergoing sampling according to signals from the slide-position detector so that the sampled voltages are sequentially stored in the form of load values corresponding to each slide position and after the measurement of the load, the stored load values are sequentially indicated together with the corresponding slide angles or slide positions.

The above and other objects and advantages of the present invention will become clear from the following description with reference to the accompanying drawing, in which,

BRIEF DESCRIPTION OF THE DRAWING

The drawing is a block diagram of an embodiment of a load monitoring system in accordance with the present invention.

DETAILED DESCRIPTION OF THE INVENTION

The present invention will now be explained in connection with a preferred embodiment shown in the drawing.

The load monitoring system in the accompanying drawing includes a load detector 1 such as a strain gauge or a piezo-electric element mounted on a press, an amplifier circuit 2 which amplifies a voltage from the load detector 1 varying according to a load applied thereon, and an automatic initial-value calibration circuit 3 which stores the voltage of the amplifier circuit 2 before measuring the load and compares the stored voltage with the voltage of the amplifier circuit 2 after load measurement start; said calibration circuit 3 having first, second and third analog switches 31, 32 and 33 and first and second operational amplifiers 34 and 35. The load monitoring system further includes an amplifier circuit 4 which compares and amplifies the initial voltage of the calibration circuit 3 with the voltage after load measurement start, an analog-to-digital (A/D) converter 5 which converts an output voltage of the amplifier circuit 4 into a numeral value (load value), and a slide-position detector 6 mounted on the press; said detector 6 comprising, in this embodiment, two pulse generators 61 and 62 which respectively generate 180 pulses for each turn and one pulse at a predetermined initial slide position. The slide-position detector 6 can be any type as long as it generates a signal in response to the slide positions. A slide-angle counting circuit 7 comprises a differentiating circuit 71 which differentiates these 180 pulses from the first pulse generator 61 at the leading and the trailing edges thereof to generate 360 pulses (i.e. generates one pulse for every 1 degree), a counter 73 which counts the 360 pulses, and a differentiating circuit 72 which differentiates the above one pulse generated from the second pulse generator 62. A comparator 10 comprises first and second circuits 101 and 102. The first circuit 101 compares content A (slide position) of the counter 73 with content B of a first slide-position setter 8 for setting a slide position at load measurement start and generates an H signal when $B>A$, while generating an L signal when $B \leq A$. The second circuit 102 compares the content A of the counter 73 with content (set value) C of a second setter 9 for setting a slide position at load measurement end and generates the H signal when $C \geq A$, while generating the L signal when $C<A$. The load monitoring system further includes a random access memory (RAM) 11 to which write and read access operation can be allowed, a first measurement/display switching circuit 12 for switching between the write operation (in which the contents of the A/D converter 5 are transferred to the RAM 11) and the read operation (in which the contents of the RAM is transferred to a first load display 16 for indication of the contents in the RAM 11), a second measurement/display switching circuit 13 for switching between the write operation (in which the contents of the counter 73 are transferred to the RAM 11) and the read operation (in which the contents of a third slide-position setter 15 for load reading is transferred to the RAM 11 and to a second display 17 for indication of the contents in the setter 15), a switch 14 for switching between the measurement (write) mode and the display (read) mode, and a gate circuit 18 having a gate 181 which causes the RAM 11 into the write mode, and gate 182 which supplies a write timing pulse to the A/D converter 5 and the RAM 11.

The load monitoring system operates as follows. As a driving shaft rotates 360 degrees, the slide moves one cycle (that is, moving up and then moves down to the initial start position). Therefore, explanation will be made in the case where the position of the slide is represented in terms of the rotational angle of the driving shaft and the load is measured and stored for every 1 degree interval in the range between 135 and 220 degrees (that is, the range where the slide moves from a position slightly lower than the bottom dead center, passes through the bottom dead center, and then moves toward the top dead center).

The second pulse generator 62 is so adjusted as to be turned on at zero degree when the slide starts at its zero-degree position (top dead center). When the second pulse generator 62 is ON, the differentiating circuit 72 will generate one pulse, the counter 73 is caused to be reset, and the third analog switch 33 is turned on. As a result, a capacitor 36 becomes discharged to clear a later-mentioned initial value.

When the slide position becomes one degree or greater the pulse generated from the first pulse generated from the first pulse generator 61 is differentiated at the differentiating circuit 71 and subsequently counted at the counter 73 as the slide position.

If the slide position is less than a set position set by the setter 8 (that is, B>A), the comparator 101 will generate the H signal so that the first analog switch 31 is turned off and the second analog switch 32 is turned on, allowing the amplified voltage from the amplifier circuit 2 to be applied to the plus terminal of the second operational amplifier 35. This amplified voltage is stored in this capacitor 36. In this case, since no load is applied to the press, the initial value of the load sensor is stored in the capacitor 36.

When the slide position reaches the set position set by the setter 8 (that is, B=A), the comparator 101 will generate the L signal. This will cause the first analog switch 31 to be turned on while the second analog switch 32 to be turned off, resulting in that the amplified voltage from the amplifier circut 2 is supplied to the first operational amplifier 34. In the meantime, the amplifier circuit 4 will compare and amplify the output voltage from the first and the second operational amplifiers 34 and 35, and will send the compared and amplified voltage (i.e., a calibrated press load) to the A/D converter 5. The converter 5 also receives the output pulse of the differentiating circuit 71 via the gate 182, and functions to convert the analog output voltage of the amplifier circuit 4 into a digital form in response to said pulse from the circuit 71.

Since the switch 14 has been set at the measurement mode, the switching circuit 12 will supply the contents of the A/D converter 5 to the RAM 11 while the switching circuit 13 will supply the contents of the counter 73 to the RAM 11. At this point, the RAM 11 will store, in response to the pulse from the gate 182, the contents (calibrated load) of the A/D converter circuit 12 into the memory address specified by the counter 73.

The operation will continue until the comparator 10 generates the L signal when the set value C becomes equal to or greater than the content A (C≧A), during which the calibrated load values corresponding to the slide positions will be stored into the RAM 11 in sequence.

If the content A of the counter 73 becomes equal to or greater than the set value C set by the setter 9, then the comparator 102 will generate the L signal to close the gates 181 and 182, whereby the RAM 11 will not store the subsequent contents of the A/D converter 5.

When the slide reaches at a predetermined position (including zero-degree position) after moving 360 degrees and then start moving from its initial zero-degree position, the pulse from the second pulse generator 62 will cause the counter 73 to be reset, the third analog switch 33 to be turned on, and the initial value having measured previously to be cleared, making ready for the next measurement.

After one cycle has been completed and the press has been stopped, a change-over by the switch 14 into the display mode will cause the switching circuit 12 to be switched so that the contents of the RAM 11 will be made ready for indication on the load display 16. At the same time, the switching circuit 13 is switched so that the memory address in the RAM 11 will be designated according to the contents of the setter 15 and the contents of the setter 15 will be made ready for indication on the slide-position display 17. At this point, if a desired slide position to be read is set in the setter 15, the slide position will appear on the slide-position display 17 and the corresponding load value will appear on the load display 16.

With the arrangement as has been disclosed in the foregoing, the time necessary to calibrate and set the system can be remarkably reduced, and the load values corresponding to the slide positions can be easily obtained without requiring operator's skill, since the system of the present invention can directly indicate the slide positions to the load values.

What is claimed is:

1. A load monitoring system for a press having a slide, comprising:
    means for providing slide position indicating signals at predetermined intervals of slide position,
    load sensing means mounted on the press for detecting a load incurred by the press and producing a load signal indicative thereof,
    memory means for respectively storing, for predetermined intervals of slide position, both said slide position indicating signals and the load signals corresponding to the indicated slide positions,
    control means for controlling the storing operation of said memory means, and
    display means for displaying both slide position and the corresponding load as read from said memory means.

2. A load monitoring system according to claim 1, wherein said control means comprises a first slide position setter for setting a slide position at load measurement start, a second slide position setter for setting a second slide position at load measurement end, and the slide position signal and the corresponding load signal are stored in said memory means between the set slide position at the load measurement start and the set slide position at the load measurement end.

3. A load monitoring system according to claim 2, wherein said control means further comprises a third slide position setter for reading the load, whereby an arbitrary slide position may be set on said third setter and the load signal corresponding to said arbitary set slide position will be read from said memory means.

4. A load monitoring system according to claim 1, wherein said means for providing slide position indicating signals comprises a slide position sensor and a counter for counting output pulses from said sensor.

5. A load monitoring system according to claim 1, further comprising a measurement/display switching circuit for switching between a load measuring operation and a load display operation, and wherein said display means is operative only when said switching circuit is switched to said load display operation.

* * * * *